United States Patent [19]
Winterfeldt

[11] Patent Number: 5,550,344
[45] Date of Patent: Aug. 27, 1996

[54] MOUNTING APPARATUS FOR A CUTTING TORCH HAVING SOFT TOUCH HEIGHT CONTROL

[75] Inventor: Duane N. Winterfeldt, Clio, S.C.

[73] Assignee: The ESAB Group, Inc., Florence, S.C.

[21] Appl. No.: 323,256

[22] Filed: Oct. 14, 1994

[51] Int. Cl.[6] ................................................. B23K 10/00
[52] U.S. Cl. ........................... 219/121.39; 219/121.44; 219/121.56; 219/121.54; 219/124.21; 219/124.34
[58] Field of Search .................... 219/121.39, 121.44, 219/121.59, 121.54, 121.55, 124.1, 124.21, 124.34, 124.31

[56] References Cited

U.S. PATENT DOCUMENTS

| | | |
|---|---|---|
| 4,284,871 | 8/1981 | Mawson et al. |
| 4,415,795 | 11/1983 | Ross et al. |
| 4,533,078 | 8/1985 | Klien et al. ............... 228/45 |
| 4,547,653 | 10/1985 | Franco-Ferreira et al. ...... 219/121.34 |
| 4,795,882 | 1/1989 | Hardwick et al. |
| 5,160,821 | 11/1992 | Oakley. |

*Primary Examiner*—Mark H. Paschall
*Attorney, Agent, or Firm*—Bell, Seltzer, Park & Gibson, P.A.

[57] ABSTRACT

An apparatus for mounting a cutting torch to a shape cutting machine is adapted to detect contact between the torch and a workpiece in the vertical direction, and between the torch and an obstruction in a lateral direction. The mounting apparatus includes a torch holding sleeve, a bearing assembly, a base ring, and a pressure release valve assembly. The bearing assembly includes an inner race portion of the sleeve, three bearing plates, three bearing pins, and an outer race which is mounted to the base ring by three compressed springs. When the torch contacts the workpiece, the base ring, the bearing plates and outer race of the bearing assembly displace linearly relative to the sleeve. An adjustment screw releases a ball stud which presses a ball against a ball seat in the valve assembly. With the ball unseated, pressurized gas is permitted to escape past the ball and to the atmosphere. A pressure differential switch senses the difference in pressure and signals the programmed control logic of the shape cutting machine to reverse the direction of the output drive which moves the torch. Similarly, when the torch contacts an obstruction, the bearing assembly rotates relative to the base ring and again displaces linearly relative to the sleeve. The mounting apparatus is also adapted to return the torch to the same operating position after the torch is removed, and the same vertical location and orientation after the torch contacts an obstruction in a lateral direction.

21 Claims, 3 Drawing Sheets

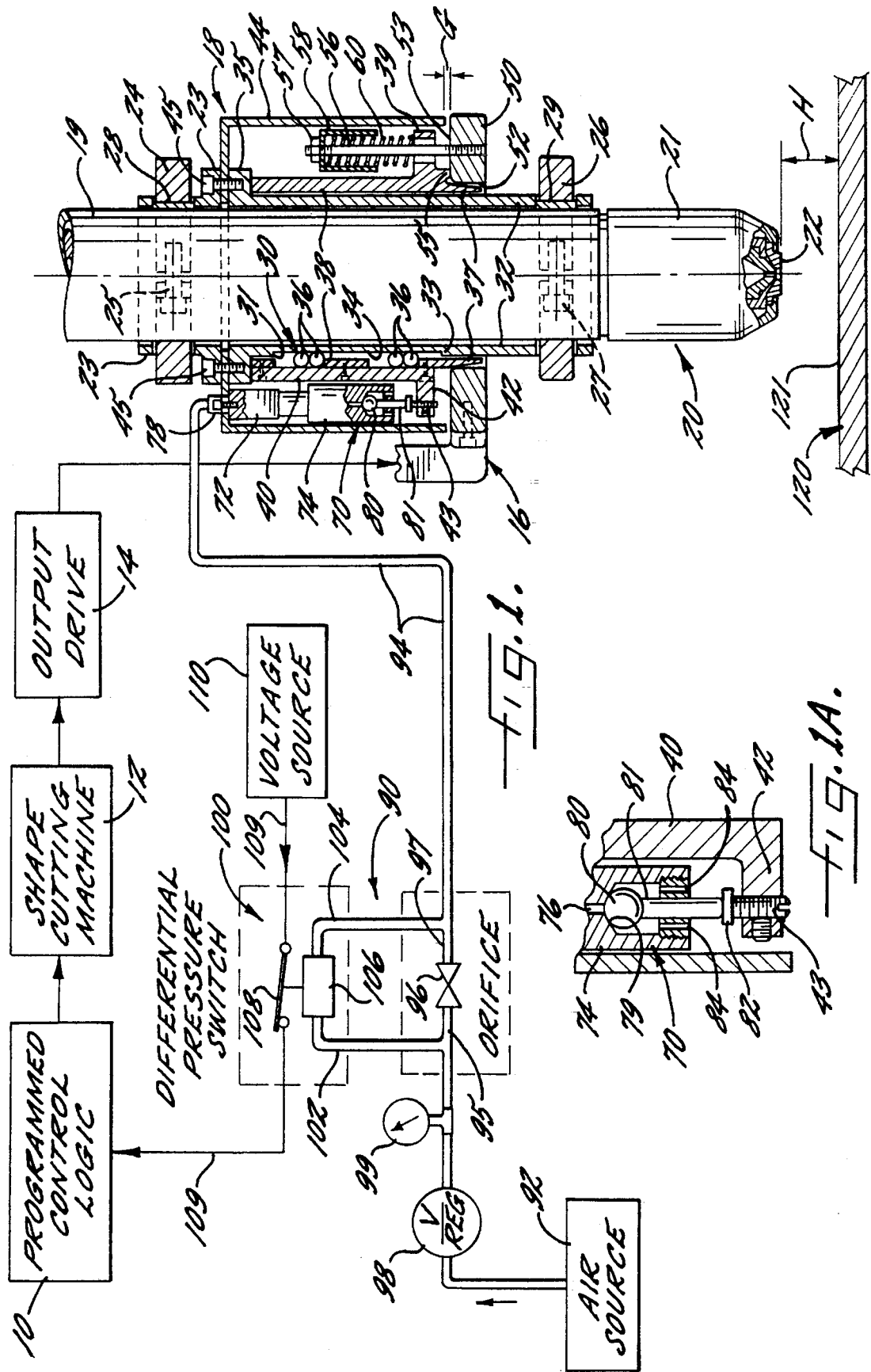

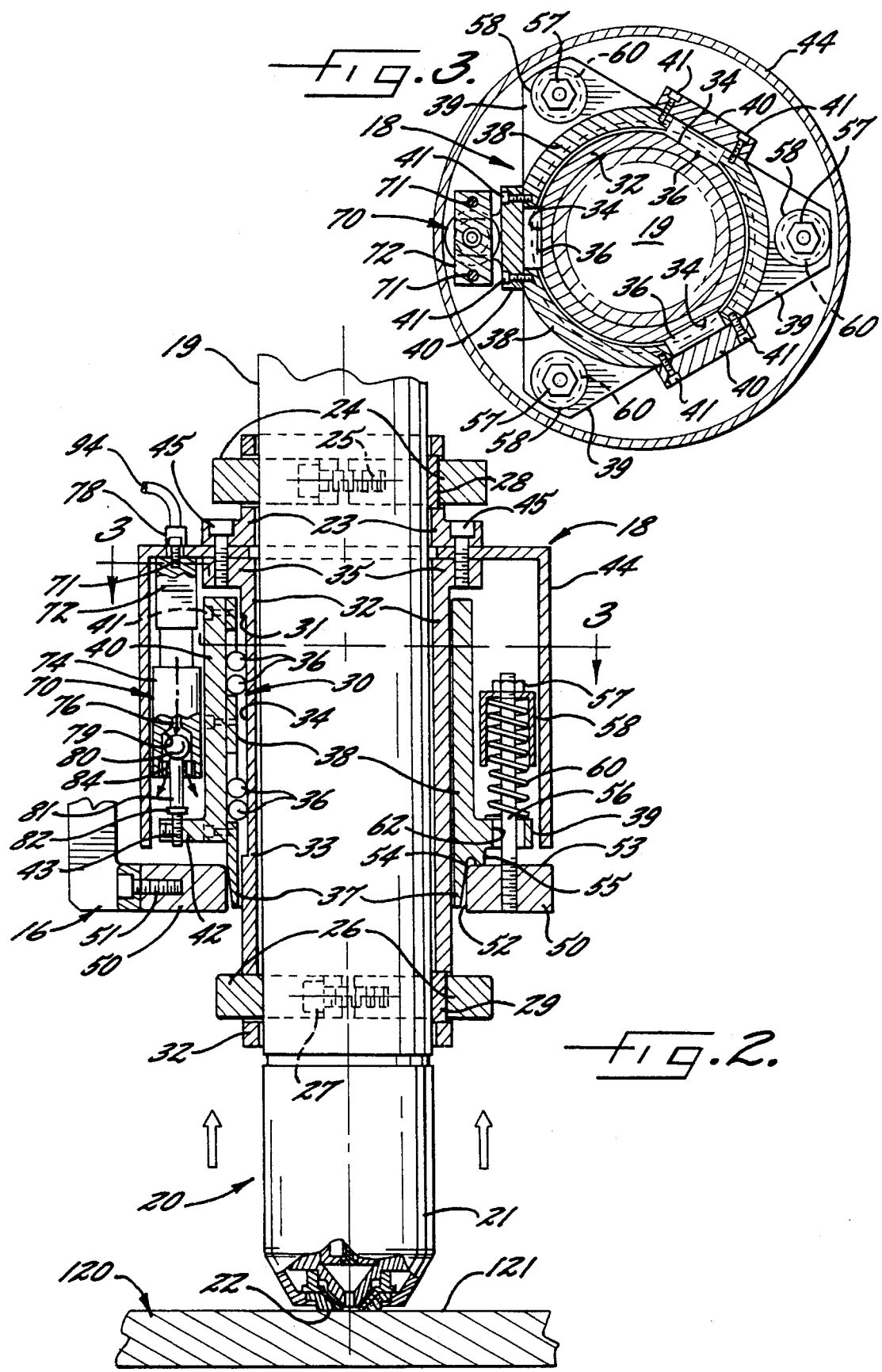

MOUNTING APPARATUS FOR A CUTTING TORCH HAVING SOFT TOUCH HEIGHT CONTROL

FIELD OF THE INVENTION

The present invention relates to an apparatus for mounting a cutting torch to a shape cutting machine which is adapted to detect contact between the torch and a workpiece, or between the torch and an obstruction during movement of the torch by the shape cutting machine. More particularly, the invention relates to a mounting apparatus for setting the working height of a plasma arc torch above a workpiece which reduces the likelihood of damage to the lower portion of the torch.

BACKGROUND OF THE INVENTION

Shape cutting machines are used to cut a metal plate into a desired configuration. A cutting torch, such as a gas or plasma arc torch, is mounted to the shape cutting machine vertically above the metal plate, or workpiece. A support bracket connected to the shape cutting machine is responsive to an output drive for moving the torch vertically and laterally to cut the workpiece into the predetermined shape. The support bracket is fixed to a mounting apparatus which supports the torch. The mounting apparatus supports the torch at a working height above the workpiece which results in the optimum cutting efficiency and life of the electrode-nozzle pair.

It is common practice to submerge the workpiece and the lower portion of the torch in a water bath during the cutting operation to reduce the emission of smoke and toxic fumes, to diminish the noise level of the operation, and to allow the arc to be viewed without the use of eyeshields for screening the ultraviolet radiation emitted by the arc. Submerging the workpiece and the lower portion of the torch in a water bath, however, increases the difficulty of setting the working height of the torch above the workpiece.

The efficiency of the cutting operation and the life of the torch, particularly a plasma arc torch, is greatly influenced by the working height. If the torch is too far from the workpiece, the energy of the transferred arc extending from the electrode to the workpiece may not be sufficient to cut the workpiece at the desired rate. If the torch is too close to the workpiece, metal debris from the cutting operation may accumulate on the nozzle and cause a double arc condition which can result in premature destruction of the nozzle-electrode pair. When the torch is at the proper working height, the transferred arc extending from the electrode to the workpiece produces the optimum amount of cutting energy without excessively damaging the electrode-nozzle pair.

Conventional means for setting the working height of the torch above the workpiece include mechanical probes, electrical switches, inductive and capacitive sensors, devices for sensing the gas pressure inside the torch when the nozzle is in close proximity to the workpiece, devices for sensing the pilot arc current as it transfers to the workpiece, and devices for sensing the increased power required by the output drive when the torch contacts the workpiece. Each of these means has a disadvantage, however, particularly when the workpiece and the lower portion of the torch are submerged in a water bath.

Mechanical probes are subject to damage from the water environment, and can be rendered inoperable by the accumulation of metal debris on the moving parts of the probe. Electrical switches are likewise subject to deterioration in the water environment. In addition, the high frequency noise generated when the arc is transferred from the electrode to the workpiece can be conducted through the direct current line from the electrical switch to the programmed control logic which automates the cutting process and commands the output drive. As a result, additional electronics and filters are required to protect the programmed control logic from being damaged by high frequency noise.

Inductive and capacitive sensors suffer from the same shortcomings as mechanical probes and electrical switches because of their proximity to the workpiece and the electrical signals which they generate. Devices which detect changes in the gas pressure inside the nozzle, and devices which sense the pilot arc current as it transfers from the nozzle to the workpiece, cannot be used with torches which are submerged in a water bath. Mounting apparatus which sense the increased power in the output drive once the torch contacts the workpiece may apply excessive force to the lower portion of the torch, or worse, can set the torch at an erroneous working height if the workpiece yields under the force applied to the workpiece by the output drive.

The lower portion of the torch generally includes an insulator which surrounds and protects the electrode and the nozzle inside the torch. Typically, the insulator is made of a material, such as ceramic, which does not thermally or electrically conduct. Ceramic insulators, however, are brittle and can be easily damaged when the force applied to the torch from contact with the workpiece is too great. For example, the ceramic insulator can crack and cause damage to the electrode-nozzle pair inside. Replacement of the insulator, electrode or nozzle usually requires the shaping machine to be shut-down for a period of time which results in a loss of throughput, or production.

An apparatus for mounting a cutting torch in a shape cutting machine above a workpiece submerged in a water bath is disclosed in U.S. Pat. No. 4,415,795 to Ross et al. The patent discloses a mounting apparatus which is adapted to detect contact between the torch and a workpiece in the vertical direction, and between the torch and an obstruction in a lateral direction. The initial working height of the torch is set by lowering a plate-sensing member which is movably mounted to a torch-supporting member until the torch comes in contact with the workpiece. The force applied to the lower portion of the torch when the torch contacts the workpiece is transferred to the plate-sensing member. Upward movement of the plate-sensing member relative to the torch-supporting member opens an electrical switch which sends a signal to the programmed control logic to command the output drive to reverse. The output drive is reversed for a predetermined time at a predetermined rate to obtain the proper working height of the torch above the workpiece.

A disadvantage of the mounting apparatus disclosed in the patent to Ross et al. is that a force greater than the weight of the torch must be applied to the lower portion of the torch before the mounting apparatus detects contact between the torch and the workpiece. Specifically, a force sufficient to overcome the frictional resistance of the plate-sensing member, and cause movement of the plate-sensing member relative to the torch-supporting member, is required to open the electrical switch which signals the programmed control logic to command the output drive to reverse. As a result, significant damage to the lower portion of the torch can occur.

The lower portion of the torch disclosed in the patent to Ross et al. is fitted with evenly-spaced metallic protrusions which extend outwardly from the bottom of the torch to protect the torch from the contact with the workpiece. The protrusions, however, cannot protect the torch if the workpiece includes imperfections on its upper surface. For example, oftentimes molten products from the cutting process will accumulate on the surface, cool, and form small, dense nodules which are higher than the depth of the protrusions. When the torch contacts the workpiece, the force applied to the lower portion of the torch is concentrated over a small surface area on the bottom of the torch opposite the nodule. The resulting local stress can exceed 100 pounds per square inch and can easily damage the ceramic insulator.

Another disadvantage of the mounting apparatus disclosed in the patent to Ross et al. which is equally, if not more important, is that the force applied to the workpiece by the lower portion of the torch can cause the working height to be set erroneously. If the workpiece is thin, or is made of a soft metal, the plate may flex downwardly under the force applied to the workpiece by the lower portion of the torch before the output drive reverses. After the output drive reverses, the plate returns to its unloaded, relaxed position. The top surface of the workpiece is then nearer to the bottom of the torch than desired, and the actual height of the torch above the workpiece is less than the desired working height.

On the other hand, if one of the protrusions extending from the bottom of the torch encounters a nodule, as described above, on the surface of the workpiece, the concentration of stress can cause the motor to reverse prematurely. In that case, the height of the torch above the workpiece will be greater than the desired working height.

Another disadvantage of the mounting apparatus disclosed in the patent to Ross et al. is that the electrical switches which signal the output drive to reverse may deteriorate and fail in the water bath environment. Failure of the electrical switches can result in severe damage to the ceramic insulator and the electrode-nozzle pair inside the lower portion of the torch. Further, there is no provision on the mounting apparatus of the patent to Ross et al. to accurately return the torch to the same operating position after the torch is removed from the apparatus.

U.S. Pat. No. 5,160,821 to Oakley and assigned to the assignee of the present invention, also discloses an apparatus for mounting a plasma arc torch to a shape cutting machine. The mounting apparatus of the patent to Oakley, however, positions the torch at the proper working height above the workpiece without the use of a mechanism which is subject to friction, or electrical switches which may deteriorate in the water bath environment.

Instead, the mounting apparatus includes a torch-supporting plate and a movement-sensing plate which are resiliently connected together. Three rigid balls are arranged in a triangular pattern between the plates with each ball seated in a concave ball seat of a pressure release valve assembly formed in one of the plates. When the lower portion of the torch comes in contact with the workpiece or an obstruction, the plates move relative to one another and at least one of the three balls is displaced from its ball seat.

When a ball is displaced from its ball seat, pressurized gas is released from the pressure release valve assembly associated with the displaced ball, thus producing a pressure differential in a gas line between the torch and the cutting machine. The pressure difference is sensed by an actuator which causes an electrical switch, located remote from the water bath environment, to signal the programmed control logic to reverse the output drive so that the torch moves away from the workpiece or the obstruction. After the force applied to the torch is removed, the resilient connection between the plates forces the balls, and thus the torch, to return to the same vertical location and angular orientation as before the contact.

While the mounting apparatus disclosed in the patent to Oakley is satisfactory in many respects, it too requires a substantial amount of force to be applied to the lower portion of the torch before the apparatus detects contact between the torch and the workpiece. Specifically, the force applied to the lower portion of the torch must be sufficient to overcome the resistance of the resilient mounting between the plates, and thus can result in damage to the sensitive tip of the torch.

Accordingly, it is an object of the invention to provide an apparatus for mounting a cutting torch to a shape cutting machine which is adapted to detect contact between the torch and a workpiece in the vertical direction, and between the torch and an obstruction in any lateral direction.

It is a more particular object of the invention to provide a mounting apparatus for setting the working height of a plasma arc torch above a workpiece submerged in a water bath which reduces the likelihood of damage to the lower portion of the torch and the electrode-nozzle pair.

It is another object of the invention to provide a mounting apparatus of a cutting torch including a mechanism for setting the working height of the torch which reduces the amount of force applied to the lower portion of the torch when the torch contacts a workpiece or an obstruction.

It is another object of the invention to provide a mounting apparatus for a cutting torch including a mechanism for setting the working height of the torch which does not include an electrical switch which may deteriorate in the operating environment of the torch, or which allows electrical noise to interfere with the programmed control logic of the torch.

It is another object of the invention to provide a mounting apparatus for a cutting torch including a mechanism for setting the working height of the torch which does not require a relatively long response time.

It is another object of the invention to provide a mounting apparatus for a cutting torch which returns the torch to the same operating position after the torch is removed.

It is another object of the invention to provide a mounting apparatus for a cutting torch which returns the torch to the same vertical location and orientation after the torch contacts an obstruction in a lateral direction.

SUMMARY OF THE INVENTION

The above and other objects and advantages of the invention are achieved in the embodiment illustrated in the drawings by the provision of a mounting apparatus for a cutting torch which is adapted to detect contact with an obstruction in the vertical direction, or any lateral direction. The mounting apparatus of the invention permits the working height of the torch above a workpiece to be set without damaging the lower portion of the torch when the torch contacts the workpiece. In addition, the mounting apparatus insures that the torch returns to the same operating position after the torch is removed, and the same vertical location and orientation after the torch contacts an obstruction in a lateral direction.

The torch is mounted to a shape cutting machine which includes an output drive for moving the torch vertically and laterally along a predetermined path such that the torch cuts a predetermined shape in the workpiece. The mounting apparatus includes an upper clamp, a lower clamp, a torch holding sleeve, a bearing assembly, a cover, an annular base ring, and a pressure release valve assembly.

The upper clamp and the lower clamp hold the torch vertically above the workpiece. The torch holding sleeve surrounds the body of the torch and includes an inner race portion which cooperates with the bearing assembly. The bearing assembly includes a hollow, cylindrical outer race, three circumferentially-spaced series of cylindrical bearing pins, and three circumferentially-spaced bearing plates fixed to the outer race which cooperate with the series of bearing pins. The inner race portion of the sleeve and the bearing plates are machined flat such that the torch and the sleeve are prevented from rotating laterally or circumferentially relative to the bearing assembly.

The cover is positioned between the sleeve and a bracket connected to the upper clamp for supporting the valve assembly. The base ring is fixed to the output drive of the shape cutting machine, and is mounted to the outer race by a triangular pattern of three compressed springs. The springs are circumferentially-spaced opposite the locations of the bearing plates and the series of bearing pins. Each spring is supported by a spring retaining screw which passes through an oversized hole in the outer race. The springs resiliently press the outer race against the base ring such that the outer race can rotate relative to the base ring about the oversized hole in response to a force in a lateral direction.

The valve assembly includes a valve body, a downwardly extending conical ball seat, a ball, a ball stud and a gas line nipple which is operatively connected to a source of pressurized gas, such as air. An adjustment screw is connected to one of the bearing plates and presses the ball stud against the ball to maintain the ball in the ball seat. A pressurized gas passageway extends downwardly from the gas line nipple through the valve body and terminates at the ball seat. Thus, when the ball is seated in the ball seat, the pressurized gas in the gas line cannot escape past the ball to the atmosphere.

An orifice is placed in the pressurized gas line between the valve assembly and a pressurized gas source. The orifice creates a difference in the pressure in the gas line when the ball is unseated from the ball seat and the pressurized gas escapes to the atmosphere. An actuator opens an electrical switch in response to the difference in the pressure in the gas line to signal the programmed control logic of the shape cutting machine to reverse the output drive.

To set the working height of the torch, the torch is lowered from a predetermined horizontal position until the lower portion of the torch contacts the workpiece. After the lower portion of the torch contacts the workpiece, the output drive continues to lower the base ring, and thus the outer race and the bearing plates. Because the outer race is mounted to the base ring, and the bearing plates are fixed to the outer race, the outer race and the bearing plates displace linearly downward. Further, because the sleeve is secured to the torch, the sleeve displaces vertically relative to the outer race and the bearing plates. Thus, the adjustment screw connected to the bearing plate moves downward (relative to the valve assembly fixed between the cover and the sleeve) and permits the ball stud to unseat the ball from the ball seat.

The movement of the ball away from the ball seat allows the pressurized gas in the gas line to escape past the ball to the atmosphere. The difference in the pressure in the gas line created by the orifice causes the actuator to open the electrical switch. The loss of the voltage from the electric line connected to the switch signals the programmed control logic of the shape cutting machine to reverse the output drive. The output drive is reversed for a predetermined time at a predetermined rate such that the torch is positioned at the proper working height above the workpiece.

The force applied to the lower portion of the torch is no greater than the weight of the torch because the series of cylindrical bearing pins of the bearing assembly permit the sleeve to move freely in the vertical direction relative to the bearing plates and the outer race. Thus, the lower portion of the torch is not damaged when the torch contacts the workpiece in the vertical direction.

The mounting apparatus of the invention also detects contact between the torch and an obstruction in a lateral direction. When a force is applied to the torch from a lateral direction, the torch rotates as much as permitted by an inwardly tapering conic angle provided on the lower portion of the outer race. The mounting apparatus, except for the base ring, rotates with the torch until the cover contacts the base ring.

As described above, the flats of the sleeve and the bearing plates prevent the bearing plates and the outer race from rotating relative to the inner race portion of the sleeve. The compressed springs, however, continue to press the outer race against the base ring. Thus, the vertical component of the angle of rotation of the torch is translated into a linear vertical displacement of the sleeve relative to the outer race and the bearing plates.

The linear displacement of the sleeve relative to the outer race and the bearing plates causes the adjustment screw to displace downwardly and the ball stud to unseat the ball from the ball seat as previously described. The pressurized gas escapes to the atmosphere, and the orifice creates a difference in the pressure in the gas line which is sensed by an actuator which causes the electrical switch to open. The programmed control logic then commands the output drive to take corrective action, such as to move the torch vertically upward and away from the obstruction.

Stepped portions provided on the upper clamp and the sleeve insure that the torch is returned to the same operating position after it is removed from the mounting apparatus. The stepped portions closely match the curvature of the body of the torch and therefore limit the gap available between the torch and the clamps for adjusting the horizontal location and angular orientation of the torch.

The conic angle of the lower portion of the outer race insures that the torch returns to the same vertical location and orientation after the torch comes in contact with an obstruction in a lateral direction. The base ring includes an inner radial surface, an upper surface, and a relatively small radius connecting the inner and the upper surfaces. When the outer race rotates, such as when the torch contacts an obstruction in a lateral direction, the inner surface and the radius of the base ring cooperate with the conic angle of the lower portion of the outer race. The base ring moves downward along the conic angle an amount equal to the vertical component of the angle of rotation of the torch.

At the same time, the compressed springs continue to press the outer race against the base ring. Thus, when the lateral force is removed, the base ring moves back upward along the conic angle and restores the torch to the same vertical location and orientation. Because the compressed springs provide an equal amount of restoring force to press the outer race against the base ring, the torch will return to the same vertical location and orientation after the torch contacts an obstruction in a lateral direction.

BRIEF DESCRIPTION OF THE DRAWINGS

Some of the objects and advantages of the present invention having been stated, others will become apparent when the description of the preferred embodiment is considered in conjunction with the accompanying drawings in which like numerals denote the same parts in the different views, and in which:

FIG. 1 is a cross-sectional view taken along the longitudinal axis of one embodiment of a mounting apparatus for a cutting torch according to the invention;

FIG. 1A is an enlarged detail of the pressure release valve assembly shown in FIG. 1.

FIG. 2 illustrates the response of the mounting apparatus of FIG. 1 when the cutting torch comes in contact with a workpiece in the vertical direction;

FIG. 3 is a sectioned view of the mounting apparatus of FIG. 2 taken substantially along the line 3—3;

DETAILED DESCRIPTION OF THE PREFERRED EMBODIMENT

Figure 4:
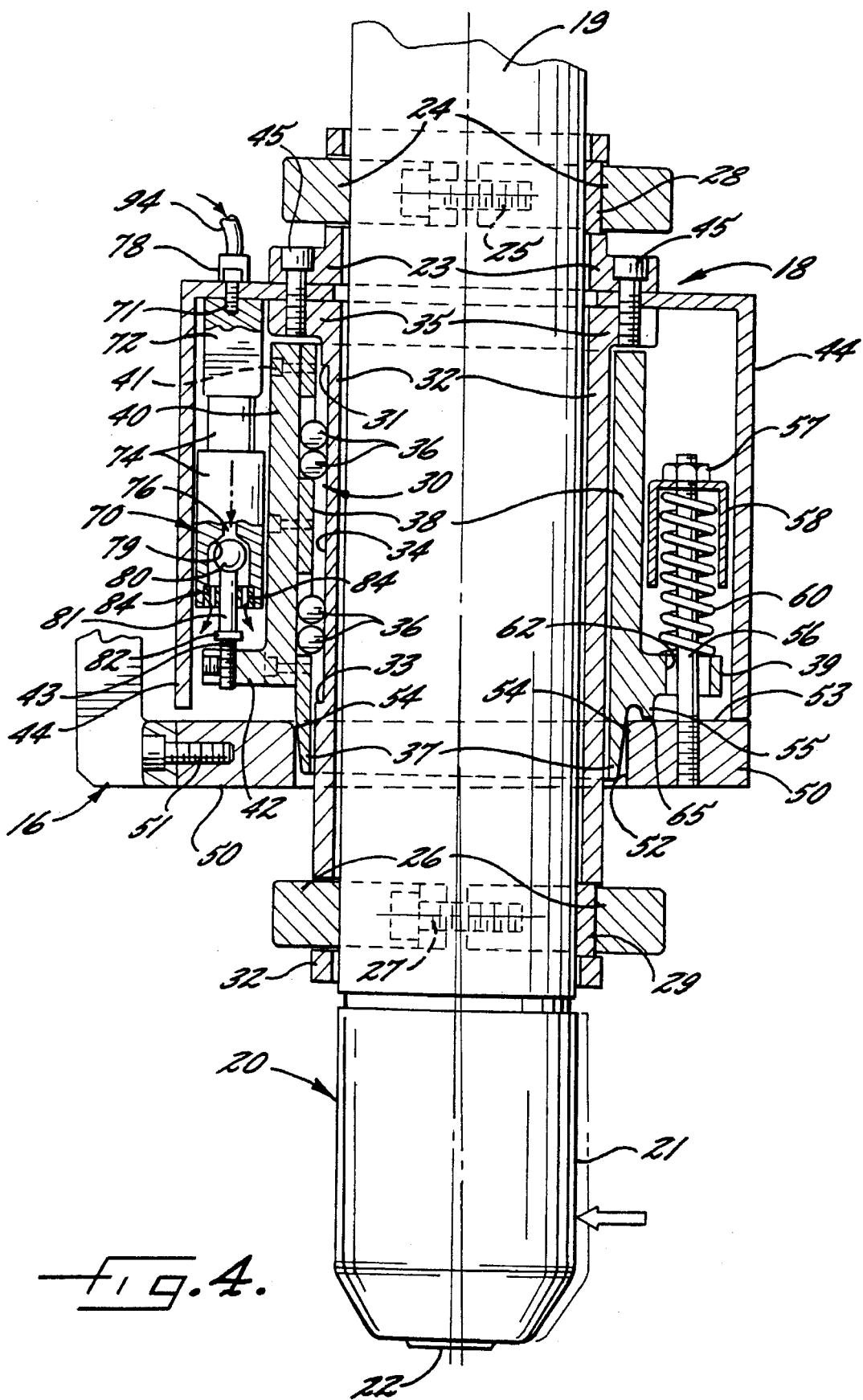
FIG. 4 illustrates the response of the mounting apparatus of FIG. 1 when the cutting torch comes in contact with an obstruction in a lateral direction.

Referring more particularly to the drawings, FIGS. 1–4 illustrate one embodiment of an apparatus for mounting a cutting torch to a shape cutting machine. The mounting apparatus is adapted to detect contact between the torch and a workpiece in a vertical direction, as well as contact between the torch and an obstruction in a lateral direction.

In the embodiment illustrated in the figures, the cutting torch is a conventional plasma arc torch 20. The torch 20 is mounted to a torch support bracket 16 of a shape cutting machine 12 for cutting a predetermined shape in a metal plate, or workpiece 120. For a further description of the shape cutting machine 12, reference is made to U.S. Pat. No. 4,415,795 to Ross et al., the disclosure of which is expressly incorporated herein by reference. As is conventional, the shape cutting machine 12 includes an output drive 14 for maneuvering the support bracket 16 vertically and horizontally in response to drive commands from a programmed control logic 10.

The workpiece 120 and the lower portion 21 of the torch 20 are submerged in a water bath (not shown) during the cutting operation. Submerging the workpiece 120 and the lower portion 21 of the torch 20 reduces the emission of smoke and toxic fumes, diminishes the noise level of the operation, and allows the operator to view the arc without eyeshields for screening the ultraviolet radiation emitted by the arc. The torch 20 is set at a predetermined working height H (FIG. 1) above the workpiece 120 for optimum cutting efficiency and life of the electrode-nozzle pair. Submerging the workpiece 120 and the lower portion 21 of the torch 20 in a water bath, however, increases the difficulty of accurately setting the working height H.

In a conventional manner, the working height H of the torch 20 above the workpiece 120 is typically set by lowering the torch until the lower portion 21 of the torch contacts the workpiece, and then raising the torch to the desired working height. The output drive 14 moves the support bracket 16 vertically downwards in response to a drive command from programmed control logic 10 until the lower portion 21 of the torch 20 contacts the workpiece 120. After the lower portion of the torch contacts the workpiece, a signal is sent to the programmed control logic 10 to reverse the output drive 14. The programmed control logic 10 commands the output drive 14 to reverse for a predetermined time at a predetermined rate so that the support bracket 16 moves vertically upwards a distance equal to the desired working height H.

Lowering the torch 20 into contact with the workpiece 120 can severely damage the ceramic insulator 22 which extends outwardly from the lower portion 21 of the torch. Ceramic insulator 22 protects the electrode-nozzle pair (not shown) inside the lower portion 21 of the torch 20 from the thermal and electrical effects of the plasma arc. If the ceramic insulator 22 cracks, the cutting water used to cool the torch may be lost, or the nozzle may come in contact with the workpiece 120 causing a double arc to attach to the nozzle.

During the cutting operation, molten products from the cutting process can accumulate on the upper surface 121 of the workpiece 120 in the vicinity of ceramic insulator 22. When the molten products cool, they form small, dense, metallic nodules (not shown) which act to concentrate the stress applied to the ceramic insulator 22 over a small surface area on the bottom of the lower portion 21 of the torch 20. The compressive stress applied to the ceramic insulator 22 can exceed, for example, 100 pounds per square inch. Thus, the ceramic insulator of a conventional mounting apparatus can easily be damaged by contact between the torch 20 and the workpiece 120 in the vertical direction.

The workpiece 120 can also yield under the force of contact applied by the torch 20, and thus cause the torch to be set at an erroneous working height H. In a conventional mounting apparatus, the force of contact between the torch 20 and the workpiece 120 must be sufficient to overcome the resistance of, for example, the friction of a sliding mechanism or the spring constant of a compressed spring, to cause an electrical switch to signal the programmed control logic 10 to reverse the output drive 14. Thus, the workpiece 120 can yield vertically by bending, or flexing under the force of contact applied by the torch 20. When the workpiece 120 returns to its unloaded, or relaxed position after yielding, the actual height of the torch 20 above the workpiece is less than the desired working height H. As a result, a double arc can attach to the nozzle and prematurely destroy the electrode-nozzle pair inside the torch 20.

The invention solves these problems by providing a mounting apparatus, indicated generally at 18, for a cutting torch which is adapted to detect contact between the torch 20 and the workpiece 120 in the vertical direction, and to substantially reduce the force of contact between the torch and the workpiece. The mounting apparatus 18 comprises an upper clamp 24, a lower clamp 26, a bearing assembly, indicated generally at 30, a cover 44, a base ring 50, and a pressure release valve assembly 70.

Upper clamp 24 comprises two halves which are joined by clamp screws 25 to radially compress a generally cylindrical upper clamp bracket 23 around the main body 19 of torch 20. The upper clamp bracket 23 is open on one side adjacent the location of upper clamp 24. On the other side, upper clamp bracket 23 comprises a half-moon shaped, stepped portion 28 around the main body 19 of torch 20.

Lower clamp 26 likewise comprises two halves which are joined by clamp screws 27 to radially compress a generally cylindrical torch holder sleeve 32 around the main body 19 of torch 20. Torch holder sleeve 32 is open on one side adjacent the location of lower clamp 26. On the other side, sleeve 32 comprises a half-moon shaped, stepped portion 29 around the main body 19 of torch 20. Together, upper clamp 24 (cooperating with upper clamp bracket 23) and lower clamp 26 (cooperating with sleeve 32) secure the torch 20 in mounting apparatus 18 and insure that the torch returns to the same operating position after it is removed in a manner to be described hereafter.

Bearing assembly 30 comprises inner race portion 34 medially located between upper shoulder 31 and lower shoulder 33 of sleeve 32. Inner race portion 34 cooperates with a series of four bearing pins 36 arranged vertically at three circumferentially-spaced locations 120 degrees apart. The series of bearing pins 36 cooperate with inner race portion 34 such that sleeve 32 is vertically movable relative to a generally cylindrical outer race 38. Outer race 38 includes a conically converging lower portion 37 which has a conic angle of about 7 degrees. Lower portion 37 insures that the torch 20 returns to the same vertical location and orientation after the torch comes in contact with an obstruction in a lateral direction in a manner to be described hereafter.

Bearing pins 36 are preferably made of a non-corrosive metal having a relatively low coefficient of surface friction, such as stainless steel, so that inner race portion 34 moves freely relative to outer race 38. Preferably, bearing pins 36 are about ½ inch long and have a diameter of about ¼ inch. Sleeve 32, including inner race portion 34, and outer race 38 are made of a non-corrosive metal, such as stainless steel or brass, having a hardness approximately equal to that of the hardness of the metal bearing pins 36.

At each of three circumferentially-spaced locations, a metal bearing plate 40 is fixed to the outer race 38. Each bearing plate 40 is secured at three vertically-spaced locations to threaded recesses in outer race 38 by bearing plate screws 41. As best seen in FIG. 3, the bearing surfaces of inner race portion 34 and bearing plates 40 are machined flat and have a close tolerance fit with bearing pins 36 so as to prevent vertical and circumferential rotation of the sleeve 32 relative to outer race 38.

At two of the three circumferentially-spaced locations, bearing plate 40 comprises a vertically oriented rectangular plate which is approximately one inch wide and three inches high. At one of the locations, however, the bearing plate 40 further comprises a foot portion 42 which extends radially outward from outer race 38. An adjustable screw 43 threadably engages a threaded recess in foot portion 42 adjacent its radial outer edge for a purpose to be described hereafter.

An inverted, cup-shaped, cylindrical cover 44 is fixed between upper clamp bracket 23 and sleeve 32. The cover 44 may be made of any relatively stiff material, but preferably the cover 44 is made of molded or machined aluminum. Upper clamp bracket 23, cover 44 and sleeve 32 are secured together by cover screws 45 which pass through four circumferentially-spaced holes in the upper clamp bracket and the cover, and engage threaded recesses in the upper flange 35 of the sleeve.

An annular base ring 50 is rigidly secured to support bracket 16 of shape cutting machine 12 by support bracket screws 51 which engage a pair of threaded recesses in the base ring. Base ring 50 is positioned adjacent the conical lower portion 37 of outer race 38. Base ring 50 comprises a small radius 54 (FIG. 2) machined between the inner surface 52 and the upper surface 53 of the base ring. In a manner to be described hereafter, inner surface 52 and radius 54 cooperate with conical lower portion 37 to return the torch 20 to the same vertical location and orientation after the torch 20 contacts an obstruction in a lateral direction.

Similarly, upper surface 53 cooperates with foot 55 of outer race 38 to maintain a gap G (as shown in FIG. 1) between cover 44 and base ring 50 during a normal cutting operation. Preferably, gap G is about 0.020 inches, however, the gap may be made larger or smaller according to the adjustment of adjusting screw 43 (which adjusts the sensitivity of the mounting apparatus 18).

At the three circumferentially-spaced locations opposite the three circumferentially-spaced locations of the series of bearing pins 36 and bearing plates 40, base ring 50 comprises a threaded recess which receives a spring retaining screw 56. A spring retaining nut 57 is threaded onto screw 56 and engages a spring retaining cap 58 through a centrally located hole in the cap. The cap 58 is open at its lower end such that it is U-shaped in cross-section and retains a compressed spring 60 between the cap and a radially extending flange 39 of outer race 38.

The force exerted by the compressed spring 60 holds foot 55 of outer race 38 firmly against the base ring 50 so that the outer race 38 can move vertically only in conjunction with the base ring 50. Flange 39 also includes a hole 62 which is oversized relative to screw 56. The hole 62 allows outer race 38, along with sleeve 32, to rotate as much as about 7 degrees (equal to the conic angle of lower portion 37) relative to base ring 50 about the corner 64 of foot 55 for a purpose to be described hereafter.

Mounting apparatus 18 further comprises a pressure release valve assembly 70 which includes a valve block 72 for mounting the valve assembly to cover 44. Cover 44 has a pair of holes in top surface 46 through which valve assembly screws 71 (FIG. 3) are threaded into corresponding threaded recesses in the top of valve block 72. A cylindrical valve body 74 is connected to valve block 72 and comprises a centrally located gas passageway 76 which extends downwards through a hole in cover 44 from a gas line nipple 78 provided in the top of valve block 72.

As best seen in FIG. 1A, the inside of valve body 74 adjacent the lower end of gas passageway 76 is provided with a conical ball seat 79 which is adapted to seat a ball 80 connected to ball stud 81. The ball 80 and ball stud 81 are made of a corrosion resistant metal, preferably stainless steel, and the ball seat 79 is formed of a molded plastic, such as nylon or polyethylene. The ball 80 is polished and has a close tolerance fit with the conic angle of ball seat 79 so that when the ball is seated in the ball seat, pressurized gas in gas passageway 76 cannot escape to the atmosphere through a series of vent holes 84.

The lower end of ball stud 81 rests against the upper surface 82 of adjustment screw 43 and passes upwardly through a close tolerance, but relatively frictionless, hole in the annular bottom of valve body 74. In this manner, the adjustment screw 43 can be positioned to press ball 80 tightly against ball seat 79. Thereafter, if the upper surface 82 of adjustment screw 43 moves vertically downward relative to valve body 74, the ball 80 will be forced out of the ball seat 79 and the pressurized gas in gas passageway 76 will escape to the atmosphere through vent holes 84 in the bottom of the valve body.

The torch mounting apparatus 18 of the invention further comprises control means 90 responsive to linear displacement between sleeve 32 and outer race 38. Control means 90 signals programmed control logic 10 to take corrective action, such as to lift the torch 20 when the torch comes in vertical contact with the workpiece 120, or to reverse the direction of horizontal travel of the torch when the torch comes in lateral contact with an obstruction. Control means 90 is described in detail in U.S. Pat. No. 5,160,821 to Oakley, and assigned to the present assignee, the disclosure of which is herein incorporated by reference.

Briefly, control means 90 comprises a source 92 of pressurized gas, such as air, and a gas line 94 which is connected between the source and gas line nipple 78. Gas line 94 has a restrictive orifice 96 positioned therein so as to define a first gas line segment 95 connecting the source 92 and the orifice, and a second gas line segment 97 connecting the orifice and the gas line nipple 78 of valve assembly 70. A conventional regulator 98 and pressure gauge 99 are positioned respectively in first gas line segment 95 between source 92 and orifice 96.

The control means 90 further comprises a differential pressure switch assembly 100 which is responsive to a difference in pressure between the first 95 and second 97 gas line segments. A difference in pressure between the first 95 and second 97 gas line segments will occur when the ball 80 is unseated from ball seat 79 by the pressurized gas in gas passageway 76. As shown in FIG. 1, the differential pressure switch assembly 100 includes a pair of gas pressure check lines 102, 104 connected to gas line 94 on respective opposite sides of orifice 96. The upper ends of check lines 102, 104 are joined together at an actuator 106 which controls the position of an electrical switch 108 in a direct current electrical line 109 connected to a voltage source 110.

As shown in FIG. 1, switch 108 is closed when the ball 80 is seated in ball seat 79 and the torch 20 is in the normal cutting position at working height H above the workpiece 120. When the torch 20 is in contact with the workpiece 120 as illustrated in FIG. 2, or in contact with an obstruction as illustrated in FIG. 4, the ball 80 is unseated from ball seat 79. The difference in pressure between first 95 and second 97 gas line segments causes actuator 106 to open switch 108 and thus interrupt the flow of electricity through electrical line 109. In response, the programmed control logic 10 commands the shape cutting machine 12 to reverse output drive 14 so that the torch 20 lifts away from the workpiece 120 or the obstruction.

FIG. 1 illustrates the torch 20 positioned at the predetermined working height H above the workpiece 120. To set the torch 20 at working height H above the workpiece 120 in accordance with the invention, the programmed control logic 10 commands the output drive 14 of the shape cutting machine 12 to position the torch in the proper horizontal location above the workpiece. Programmed control logic 10 next commands output drive 14 to lower the torch 20 vertically downward until eventually the lower portion 21 of the torch contacts the workpiece 120. The torch 20 is lowered by support bracket 16 which is fixed to base ring 50. Base ring 50 in turn lowers outer race 38 through the interaction of compressed springs 60 which hold each foot 55 against the upper surface 53 of the base ring.

The positive air pressure in gas passageway 76 acting on ball 80 forces ball stud 81 of valve assembly 70 to remain in contact with adjustment screw 43. At the same time, the weight of cover 44, valve assembly 70, sleeve 32, upper clamp 24, lower clamp 26 and the torch 20 keep the ball 80 firmly seated in ball seat 79. Thus, the pressurized gas in gas passageway 76 cannot escape past the ball 80 to the atmosphere through the vent holes 84.

When the lower portion 21 of torch 20 comes in vertical contact with the workpiece 120, as illustrated in FIG. 2, support bracket 16 continues to lower base ring 50, outer race 38 and bearing plates 40, while the movement of the cover 44, valve assembly 70, sleeve 32, upper clamp 24, lower clamp 26 and torch 20 is arrested. Thus, bearing plates 40 (which are fixed to the outer race 38) and the outer race displace linearly downward relative to inner race portion 34 and sleeve 32 as permitted by the series of bearing pins 36 of bearing assembly 30.

Consequently, adjustment screw 43 no longer presses ball stud 81 and ball 80 of valve assembly 70 against ball seat 79, and the pressurized gas in gas passageway 76 unseats the ball from the ball seat and escapes past the ball to the atmosphere through vent holes 84. The differential pressure switch assembly 100 senses the difference in pressure between the first 95 and second 97 gas line segments, and actuator 106 opens electrical switch 108 to signal programmed control logic 10 to command the output drive 14 of shape cutting machine 12 to reverse, as described above, for a predetermined time at a predetermined rate to set the working height H.

The likelihood of damage to ceramic insulator 22 of torch 20 is thereby reduced because an upward force equal only to the weight of the torch is required to detect contact between the torch 20 and the workpiece 120 in the vertical direction. The small amount of force applied to the torch 20 is sufficient to unseat ball 80 from ball seat 79 and create a difference in pressure between the first 95 and second 97 gas line segments. The mounting apparatus 18 of the invention does not need to overcome the compressive force of springs, or the sliding force of a mechanism to cause electrical switch 108 to signal the output drive 14 to reverse. Instead, the resistance to vertical displacement is minimal because the components of the bearing assembly 30 allow the inner race portion 34 of the sleeve 32 to move freely in the vertical direction relative to the bearing plates 40 and the outer race 38.

A further advantage of the invention is that the mounting apparatus 18 does not include a mechanical probe or an electrical switch in the vicinity of the lower portion 21 of the torch 20. As discussed above, mechanical probes and electrical switches can deteriorate in the water bath environment, and electrical switches can permit electrical noise generated when the arc is transferred from the electrode to the workpiece to be conducted through the direct current line from the switch to the programmed control logic which automates the cutting process and commands the output drive.

As illustrated in FIG. 4, the mounting apparatus 18 of the invention also protects the torch 20 from damage when the torch comes in contact with an obstruction, such as the wall of the water bath, in a lateral direction. The force F applied to the lower portion 21 of the torch 20 from the right causes the torch to rotate about the corner 65 of the foot 55 nearest the force F. The torch 20 can rotate around the corner 65 of the foot 55 until the gap G (FIG. 1) is closed and the cover 44 rests against the base ring 55. The torch 20 can rotate as much as about 7 degrees before the cover 44 rests against the base ring 50 because the conic angle of the lower portion 37 of the outer race 38 is about 7 degrees.

When the torch 20 and the cover 44 rotate, the remainder of the mounting apparatus 18, except the base ring 50 and the spring retaining screws 56, rotate along with the torch and the cover. The base ring 50 remains horizontal and the screws 56 remain vertical. The lower clamp 26, the upper clamp 24, the valve assembly 70 and the sleeve 32 rotate because they are fixed to the torch 20 and the cover 44. The bearing plates 40 and the outer race 38 rotate with the torch 20 and the cover 44 because of the close tolerance fit between the bearing pins 36 and the flats of the inner race portion 34 of sleeve 32 and the bearing plates 40.

At the same time, the force of the two remaining compressed springs 60 press each corresponding foot 55 against the base ring 50 while allowing the outer race 38 to rotate relative to the base ring and the spring retaining screws about the oversized holes 62 in the flanges 39 of the outer race. Accordingly, the vertical component of the angle of rotation is translated into linear displacement between the sleeve 32, and the bearing plates 40 and the outer race 38, as indicated by the angled, dashed line L in FIG. 4. The linear displacement between the sleeve 32, and the bearing plates 40 and the outer race 38, unseats the ball 80 from ball seat 79 and allows the pressurized gas in gas passageway 76 to escape to the atmosphere. In the manner previously described, electrical switch 108 opens and signals the programmed control logic 10 to reverse the output drive 14 and move the torch 20 laterally away from the obstruction.

It should be appreciated from the description of the illustrated embodiment that the mounting apparatus 18 of the invention provides protection against contact between the torch 20 and an obstruction in any lateral direction. Omni-directional crash protection is provided because the triangular pattern of the three compressed springs 60 and the three bearing plates 40 insures that the sleeve 32 will always displace linearly in the vertical direction relative to the bearing plates and the outer race 38.

A further advantage of the invention is that after the torch is removed for service, such as to replace a spent electrode, the mounting apparatus 18 returns the torch 20 to the same operating position. The stepped portions 28, 29 in upper clamp bracket 23 and sleeve 32, respectively, insure that the torch 20 returns to the same operating position after removal because they limit the gap between the main body 19 of torch 20 and the upper clamp bracket and the sleeve on one side.

The curvature of the stepped portions 28, 29 closely matches the curvature of the main body 19 of torch 20 so that tightening the clamp screws 25 and 27 returns the torch to the same horizontal location and angular orientation after the torch is removed. Positive repositioning of the torch 20 permits the operator to continue the cutting operation with a minimum of down time, and thereby increases the production, or throughput of the shape cutting machine.

The mounting apparatus 18 also returns the torch 20 to the same vertical location and orientation after the torch contacts an obstruction in a lateral direction. Compressed springs 60 and the conic angle of the lower portion 37 of the outer race 38 positively locate the base ring 50 each foot 55 of the outer race. When the torch 20 and the outer race 38 rotate relative to the base ring 50 in response to force F, the inner surface 52 and the radius 54 of the base ring ride down the conic angle of the lower portion 37 of the outer race.

After the force F is removed, the compressed springs 60 press the flanges 39, and thus each foot 55, against the upper surface 53 of the base ring 50. Accordingly, the inner surface 52 and the radius 54 of the base ring 50 ride back up the conic angle of the lower portion 37 of the outer race 38 exactly the same amount so that the torch is returned to the same vertical location and angular orientation after contact with an obstruction in a lateral direction.

In the drawings and the specification, there has been set forth a preferred embodiment of the invention, and although specific terms are employed, they are used in a generic and descriptive sense only and not for purposes of limitation. Many variations of the example of the invention set forth in the detailed description and the drawings will be apparent to those skilled in the art. It is thus intended that the description of the invention provided be construed as broadly as possible to include all such variations which will be known to those skilled in the art.

That which is claimed is:

1. An apparatus for mounting a cutting torch to a shape cutting machine, said apparatus adapted to detect contact with an obstruction during movement of the torch in the vertical or a lateral direction, said apparatus comprising a cylindrical sleeve secured to the torch, said sleeve comprising an inner race portion at a medial location along the outer surface of said sleeve;

an annular base ring fixed to the shape cutting machine so that the torch may be moved vertically or laterally along a predetermined path;

a bearing assembly comprising an outer race connected to said base ring so as to surround said sleeve and for permitting linear displacement of said sleeve relative to the outer race; and control means responsive to the displacement of said sleeve relative to the outer race of said bearing assembly caused by the torch contacting an obstruction in the vertical or a lateral direction, and for generating a signal adapted to be sent to the shape cutting machine so that the machine may take corrective action.

2. The apparatus of claim 1 wherein the inner race portion of said sleeve comprises three circumferentially-spaced flats, each flat cooperating with a corresponding series of bearings of said bearing assembly.

3. The apparatus of claim 2 wherein each series of bearings of said bearing assembly comprises a plurality of cylindrical bearing pins, each bearing pin defining a longitudinal axis perpendicular to the vertical direction.

4. The apparatus of claim 1 wherein said bearing assembly comprises a plurality of circumferentially-spaced bearing plates, each bearing plate secured to the outer race and cooperating with a corresponding series of bearing pins of said bearing assembly.

5. The apparatus of claim 1 wherein the outer race is connected to said base ring by a plurality of circumferentially-spaced compressed springs which resiliently hold the outer race against said base ring.

6. The apparatus of claim 5 wherein the outer race comprises oversized holes for permitting the outer race to rotate relative to said base ring in response to contact with an obstruction in a lateral direction.

7. The apparatus of claim 6 wherein the outer race is cylindrically-shaped and further comprises an inwardly tapering conic portion at the lower end of the outer race radially adjacent said base ring.

8. The apparatus of claim 7 wherein said annular base ring comprises a vertical inner surface, a horizontal upper surface, and a relatively small radius corner connecting the inner surface and the upper surface, the inner surface and the corner cooperating with the conic portion of the outer race to return the torch to the same vertical location and angular orientation after contact with an obstruction.

9. The apparatus of claim 1 wherein said control means comprises a pressurized gas source;

a gas line connected to said pressurized gas source;

valve means operatively connected to said gas line for at least partially opening said gas line and permitting pressurized gas from said pressurized gas source to escape to atmosphere when said sleeve is displaced relative to the outer race of said bearing assembly; and switch means responsive to said valve means for generating a signal to control said shape cutting machine.

10. The apparatus of claim 9 wherein said valve means comprises a conical ball seat, a ball and a ball stud, such that the ball stud presses the ball against the ball seat to close said valve means, and the ball stud and the ball move downwardly away from the ball seat to open said valve means and permit pressurized gas from said pressurized gas source to escape to atmosphere.

11. The apparatus of claim 10 wherein the ball seat is made of nylon and the ball is made of stainless steel.

12. An apparatus for mounting a cutting torch to a shape cutting machine, said apparatus adapted to detect contact with an obstruction during movement of the torch in the vertical or a lateral direction, said apparatus comprising a generally cylindrical torch which defines a central axis;

a cylindrical sleeve mounted so as to coaxially surround said torch;

a bearing assembly mounted so as to coaxially surround said sleeve and including means for permitting relative axial movement therebetween;

an annular base ring fixed to the shape cutting machine so as to coaxially surround said torch in a spaced apart arrangement;

means resiliently interconnecting said base ring and said bearing assembly so as to connect said torch to said shape cutting machine and so as to permit the torch, cylindrical sleeve, and bearing assembly to collectively pivot laterally with respect to said central axis and to cause relative axial movement between said cylindrical sleeve and said bearing assembly upon such pivotal movement; and control means responsive to the relative axial movement between said cylindrical sleeve and said bearing assembly caused by the torch contacting an obstruction in the axial or a lateral direction, and for generating a signal adapted to be sent to the shape cutting machine so that the machine may take corrective action.

13. The apparatus as defined in claim 12 wherein said means for permitting the relative axial movement between said cylindrical sleeve and said bearing assembly comprises an inner bearing race on the outer surface of said cylindrical sleeve, an outer bearing race on the inner surface of said bearing assembly so as to oppose said inner bearing race, and a plurality of roller bearings disposed between said inner bearing race and said outer bearing race.

14. The apparatus as defined in claim 12 wherein said base ring includes an inwardly facing annular surface, and said bearing-assembly comprises an inwardly tapering conic portion which is received within said inwardly facing annular surface.

15. An apparatus for mounting a cutting torch to a shape cutting machine, said apparatus adapted to detect contact with an obstruction during movement of the torch in the vertical or a lateral direction, movement of the torch accomplished by an output drive controlled by the shape cutting machine, said apparatus comprising a cylindrical sleeve secured to the torch by an upper clamp and a lower clamp, said sleeve defining a longitudinal axis of the torch in the vertical direction, said sleeve comprising an inner race portion at a medial location along the outer surface of said sleeve;

an annular base ring fixed to the output drive of said shape cutting machine so that the output drive may move the torch vertically or laterally along a predetermined path;

a bearing assembly comprising an outer race, three circumferentially-spaced series of cylindrical bearing pins cooperating with the inner race portion of said sleeve, and three circumferentially-spaced bearing plates cooperating with the three series of bearing pins, said bearing assembly connected to said base ring for permitting displacement of said sleeve relative to the outer race when the torch contacts an obstruction in the vertical or a lateral direction; and control means responsive to the displacement of said sleeve relative to the outer race of said bearing assembly caused by the torch contacting an obstruction in the vertical or a lateral direction, and for generating an electrical signal adapted to be sent to the shape cutting machine so that the machine may take corrective action, said control means comprising a pressurized gas source;

a gas line connected to said pressurized gas source;

valve means operatively connected to said gas line for at least partially opening said gas line and permitting pressurized gas from said pressurized gas source to escape to atmosphere when said sleeve is displaced relative to the outer race of said bearing assembly; and switch means responsive to said valve means for generating a signal to control the output drive of the shape cutting machine.

16. A method of setting the working height of a cutting torch of a shape cutting machine above a workpiece, the shape cutting machine having an output drive for moving the torch vertically or laterally along a predetermined path, the method comprising the steps of mounting the torch in a mounting apparatus such that the torch is positioned vertically above the workpiece;

commanding the output drive to lower the torch;

lowering the torch until the lower portion of the torch contacts the workpiece and a torch holding sleeve secured to the torch displaces vertically relative to an outer race of a bearing assembly connected to the output drive;

sensing the vertical displacement of the sleeve using a valve means which opens in response to the displacement of the sleeve relative to the outer race of the bearing assembly;

signaling the shape cutting machine to reverse the output drive; and raising the torch for a predetermined time at a predetermined rate to set the working height of the torch above the workpiece.

17. The method of claim 16 wherein the step of sensing the vertical displacement of the sleeve further comprises the step of unseating a ball from a ball seat to permit a stream of pressurized gas to escape to atmosphere.

18. The method of claim 16 wherein the step of signaling the shape cutting machine to reverse the output drive further comprises the steps of sensing a difference in pressure across an orifice in a pressurized gas line caused by the stream of pressurized gas in the gas line escaping to atmosphere;

opening an electrical switch communicating with a programmed control logic of the shape cutting machine to command the shape cutting machine to reverse the output drive.

19. A method of detecting contact of a cutting torch of a shape cutting machine with an obstruction in a lateral direction, the shape cutting machine having an output drive for moving the torch vertically or laterally along a predetermined path, the method comprising the steps of contacting an obstruction in a lateral direction during movement of the torch by the output drive of the shape cutting machine;

permitting a torch holding sleeve secured to the torch and a bearing assembly communicating with the sleeve to rotate relative to a base ring connected to the output drive of the shape cutting machine;

sensing the vertical component of the rotation of the sleeve and the bearing assembly relative to the base ring with a valve means which opens in response to the vertical displacement of the sleeve relative to an outer race of the bearing assembly;

signaling the shape cutting machine to reverse the output drive; and moving the torch away from the obstruction in the vertical or a lateral direction.

20. The method of claim 19 wherein the step of sensing the vertical component of the rotation of the sleeve relative to the bearing assembly further comprises the step of unseating a ball from a ball seat to permit a stream of pressurized gas to escape to atmosphere.

21. The method of claim 19 wherein the step of signaling the shape cutting machine to reverse the output drive further comprises the steps of sensing a difference in pressure across an orifice in a pressurized gas line caused by the stream of pressurized gas in the gas line escaping to atmosphere;

opening an electrical switch communicating with a programmed control logic of the shape cutting machine to signal the shape cutting machine to reverse the output drive.

* * * * *